United States Patent
Fujii

(10) Patent No.: US 6,979,978 B2
(45) Date of Patent: Dec. 27, 2005

(54) BATTERY PACK EMPLOYING CHARGE CONTROL DEVICE

(75) Inventor: Masaaki Fujii, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/071,201

(22) Filed: Mar. 4, 2005

(65) Prior Publication Data

US 2005/0140339 A1    Jun. 30, 2005

Related U.S. Application Data

(62) Division of application No. 10/316,152, filed on Dec. 11, 2002, now Pat. No. 6,894,458.

(30) Foreign Application Priority Data

Dec. 11, 2001  (JP) ............................ 2001-376771

(51) Int. Cl.$^7$ ............................................. H01M 10/46
(52) U.S. Cl. ................................................... 320/137
(58) Field of Search ............................... 320/127, 128, 320/134, 137, 152, 162

(56) References Cited

U.S. PATENT DOCUMENTS

| | | | |
|---|---|---|---|
| 5,557,180 A |  | 9/1996 | Cameron |
| 5,672,953 A |  | 9/1997 | Kim |
| 5,945,810 A | * | 8/1999 | Fujita et al. ................. 320/134 |
| 6,424,123 B1 | * | 7/2002 | Odaohhara et al. ......... 320/134 |
| 6,803,745 B2 | * | 10/2004 | Nishida et al. ............. 320/112 |

* cited by examiner

*Primary Examiner*—Edward H. Tso
(74) *Attorney, Agent, or Firm*—Morgan, Lewis & Bockius LLP

(57) ABSTRACT

A charge control device has a full charge detection circuit for checking whether a secondary cell is in a fully charged state or not based on the charge voltage and/or the charge current of the secondary cell, a control circuit for controlling the feeding of electric power to the secondary cell according to the output of the full charge detection circuit, a storage circuit for storing control information, and a setting circuit for setting the level of the charge voltage and/or the charge current at which the full charge detection circuit recognizes the fully charged state according to the control information read from the storage circuit. The control information is fed into the storage circuit from outside. With this configuration, it is possible to accurately control the charging of a secondary cell by canceling the influence of stress occurring when an IC is packaged or mounted on a circuit board and other factors.

7 Claims, 2 Drawing Sheets

BATTERY PACK EMPLOYING CHARGE CONTROL DEVICE

This application is a Divisional of U.S. patent application Ser. No. 10/316,152 filed on Dec. 11, 2002 now U.S. Pat. No. 6,894,458 and claims the benefit of the Japanese patent Application No. 2001-376771, filed in Japan on Dec. 11, 2001, both of which are hereby incorporated by reference in their entirety.

BACKGROUND OF THE INVENTION

1. Field of the Invention

The present invention relates to a charge control device for controlling the charging of a secondary cell or battery (hereinafter collectively referred to as a "secondary cell" throughout the specification and the claims) by monitoring its charge state, and relates also to a battery pack employing such a charge control device.

2. Description of the Prior Art

FIG. 2 is a diagram showing an outline of the configuration of an example of a conventional battery pack incorporating a charge control device. The battery pack 1' shown in this figure is composed of a rechargeable secondary cell 2', a charge control IC 3' for controlling the charging of the secondary cell 2' by monitoring its charge state, feed terminals 4a' and 4b' to which direct-current electric power is fed from a charger (not shown), a switch device 5' connected between the feed terminal 4a' and the positive electrode of the secondary cell 2', and a sense resistor 6' connected between the negative electrode of the secondary cell 2' and the feed terminal 4b' (ground line). The sense resistor 6' has a very low resistance (generally a few tens of mΩ), which permits the charge current flowing through the secondary cell 2' to be detected as a voltage.

The charge control IC 3' is built by sealing into a single package a first full charge detection circuit 31' for checking whether the secondary cell 2' is in the fully charged state or not by comparing its charge voltage with a predetermined reference voltage, a direct-current voltage source 32' for generating the reference voltage, a second full charge detection circuit 34' for checking whether the secondary cell 2' is in the fully charged state or not by comparing the voltages at both ends of the sense resistor 6', and a control circuit 35' for controlling the feeding of electric power to the secondary cell 2' by turning on and off the switch device 5' according to the output signals of the first and second full charge detection circuits 31' and 34'.

It is true that, in this battery pack 1', the charge control IC 3' can monitor the charge state of the secondary cell 2' and control its charging in a considerably satisfactory manner.

However, in the charge control IC 3' configured as described above, the reference voltage generated by the direct-current voltage source 32' (i.e., the level of the charge voltage at which the first full charge detection circuit 31' recognizes the fully charged state) is fixed at the time of the fabrication of the circuit. This makes it impossible to cancel factors that cause variations in the reference voltage after the fabrication of the circuit (for example, the influence of stress occurring when the charge control IC 3' is packaged or mounted on a circuit board) and fabrication-associated variations in the secondary cell 2' itself, the very target monitored by the charge control IC 3'. Thus, in the charge control IC 3' configured as described above, to ensure safe charging operation, the level of the charge voltage at which to recognize the fully charged state needs to be set rather low. This makes it impossible to make the most of the charge capacity of the secondary cell 2'.

On the other hand, the second full charge detection circuit 34' is so configured as to check whether the secondary cell 2' is in the fully charged state or not by comparing the voltages at both ends of the sense resistor 6', which is connected externally. Therefore, by setting the resistance of the sense resistor 6' appropriately, it is possible to vary the level of the charge current at which to recognize the fully charged state. However, since the sense resistor 6' has a very low resistance, it tends to be influenced by variations in connection and wiring resistances and other factors. This makes it extremely difficult to correct for a variation in the level at which to recognize the fully charged state. Thus, in the charge control IC 3' configured as described above, to ensure safe charging operation, the level of the charge current at which to recognize the fully charged state also needs to be set rather low. This makes it impossible to make the most of the charge capacity of the secondary cell 2'. Moreover, the sense resistor 6', connected externally, hampers the scaling-down and cost reduction of the battery pack 1'.

SUMMARY OF THE INVENTION

An object of the present invention is to provide a charge control device that can accurately control the charging of a secondary cell by canceling the influence of stress occurring when an IC is packaged or mounted on a circuit board and other factors, and to provide a battery pack employing such a charge control device.

To achieve the above object, according to the present invention, a charge control device is provided with a full charge detection circuit for checking whether a secondary cell is in a fully charged state or not based on the charge voltage and/or the charge current of the secondary cell, a control circuit for controlling the feeding of electric power to the secondary cell according to the output of the full charge detection circuit, a storage circuit for storing control information, and a setting circuit for setting the level of the charge voltage and/or the charge current at which the full charge detection circuit recognizes the fully charged state according to the control information read from the storage circuit. Here, the control information is fed into the storage circuit from outside. With this configuration, it is possible to accurately control the charging of a secondary cell by canceling the influence of stress occurring when an IC is packaged or mounted on a circuit board and other factors.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
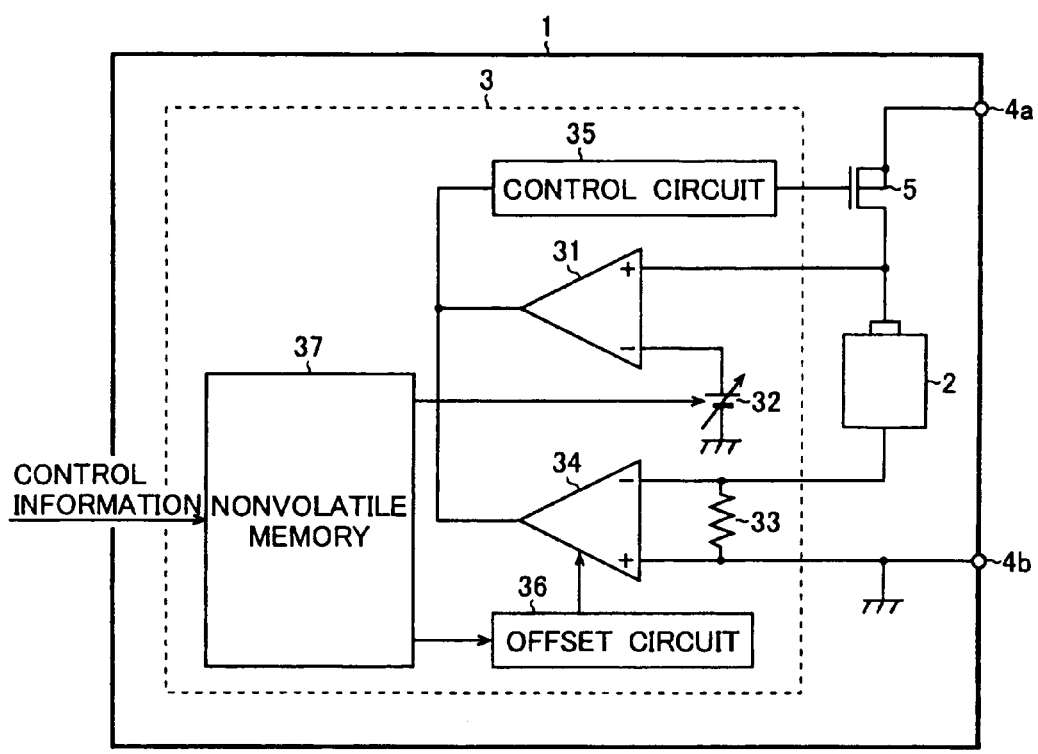
FIG. 1 is a diagram showing an outline of the configuration of an example of a battery pack incorporating a charge control device embodying the invention.

FIG. 1 is a diagram showing an outline of the configuration of an example of a battery pack incorporating a charge control device embodying the invention. The battery pack 1 of this embodiment is composed of a rechargeable secondary cell 2 (for example, a lithium ion cell), a charge control IC 3 for controlling the charging of the secondary cell 2 by monitoring its charge state, feed terminals 4a and 4b to which direct-current electric power is fed from a charger (not shown), and a switch device 5 (for example, a MOS transistor) connected between the feed terminal 4a and the positive electrode of the secondary cell 2.

The charge control IC 3 is built by sealing into a single package a first full charge detection circuit 31 for checking whether the secondary cell 2 is in the fully charged state or not by comparing its charge voltage with a predetermined reference voltage, a variable direct-current voltage source 32 for generating the reference voltage, a sense resistor 33 connected between the negative electrode of the secondary cell 2 and the feed terminal 4b (ground line), a second full charge detection circuit 34 for checking whether the secondary cell 2 is in the fully charged state or not by comparing the voltages at both ends of the sense resistor 33, a control circuit 35 for controlling the feeding of electric power to the secondary cell 2 by turning on and off the switch device 5 according to the output signals of the first and second full charge detection circuits 31 and 34, an offset circuit 36 for offsetting the level at which the second full charge detection circuit 34 inverts its output, and a nonvolatile memory 37 (for example, a flash memory) for storing control information fed from outside. The nonvolatile memory 37 may be provided on a separate chip that is connected to the charge control IC 3 in a chip-on-chip fashion.

The output signal level of the first full charge detection circuit 31 is low (at the logical low level) or high (at the logical high level) according to whether the charge voltage of the secondary cell 2 is lower or higher, respectively, than the reference voltage generated by the variable direct-current voltage source 32. On the other hand, the output signal level of the second full charge detection circuit 34 is low or high according to whether the voltage across the sense resistor 33 is higher or lower, respectively, than the offset level set by the offset circuit 36.

When one of the output signal levels of the first and second full charge detection circuits 31 and 34 becomes high, the control circuit 35 recognizes that at least one of the charge voltage and charge current of the secondary cell 2 indicates the fully charged state, and opens the switch device 5. With this configuration, it is possible to prevent the secondary cell 2 from being overcharged.

Here, the variable direct-current voltage source 32 of this embodiment can set the aforementioned reference voltage (i.e., the level of the charge voltage at which the first full charge detection circuit 31 recognizes the fully charged state) according to the control information read from the nonvolatile memory 37. Moreover, the offset circuit 36 of this embodiment can set the aforementioned offset level (i.e., the level of the charge current at which the second full charge detection circuit 34 recognizes the fully charged state) likewise according to the control information read from the nonvolatile memory 37.

With this configuration, in the charge control IC 3 of this embodiment, even after the charge control IC 3 is packaged or mounted on a circuit board, or after the secondary cell 2 is connected, it is possible, by rewriting what is stored in the nonvolatile memory 37, to easily change the set levels of the charge voltage and charge current at which to recognize the fully charged state.

Thus, by writing control information to the nonvolatile memory 37 after the charge control IC 3 is built into the battery pack 1, it is possible to optimize the levels of the charge voltage and charge current at which to recognize the fully charged state by canceling all factors that cause variations in the reference voltage after the fabrication of the circuit (for example, the influence of stress occurring when the charge control IC 3 is packaged or mounted on a circuit board) and all fabrication-associated variations in the secondary cell 2 itself, the very target monitored by the charge control IC 3.

Figure 2:
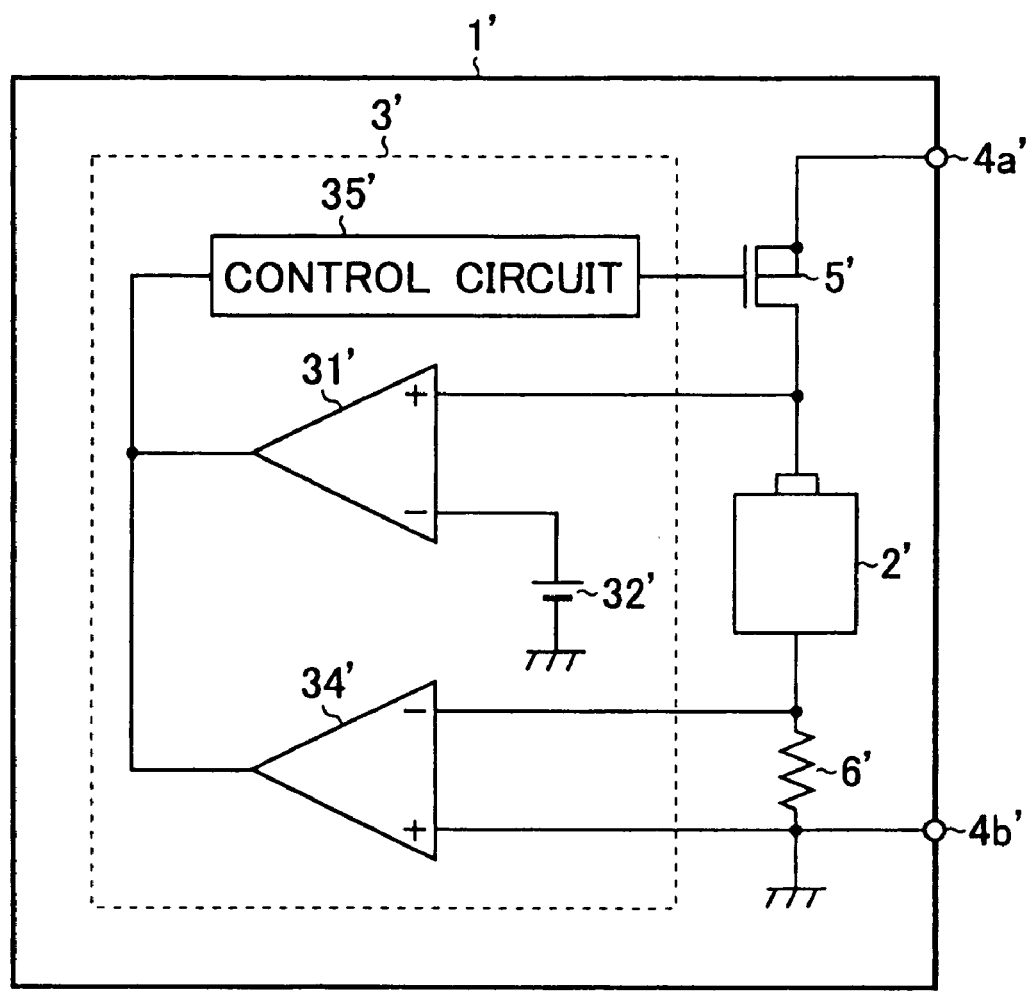
FIG. 2 is a diagram showing an outline of the configuration of an example of a conventional battery pack incorporating a charge control device.

That is, whereas in the conventional charge control IC 3' (see FIG. 2), where about ±0.5% variations are inevitable in the detected levels of the charge voltage and charge current, the levels at which to recognize the fully charged state is set rather low to ensure safe charting operation, in the charge control IC 3 of this embodiment, where variations in the detected levels are reduced to ±0.1% or smaller, there is no need to unnecessarily lower the levels at which to recognize the fully charged state. This makes possible more effective use of the charge capacity of the secondary cell 2.

Moreover, in the charge control IC 3 of this embodiment, the nonvolatile memory 37 is used as a medium for recording the control information. Thus, even if the supply of electric power to the charge control IC 3 is cut, what is stored in it remains safe. Therefore, once the levels at which to recognize the fully charged state are optimized, there is no need any longer to write control information to the nonvolatile memory 37 again.

Moreover, adopting the charge control IC 3 of this embodiment eliminates the need to externally connect a sense resistor for detecting the charge current of the secondary cell 2. This helps realize the scaling-down and cost reduction of the battery pack 1.

The switch device 5 may be formed within the charge control IC 3. The nonvolatile memory 37 may be provided as a separate IC chip that is mounted on the charge control IC 3 in a chip-on-chip fashion.

As described above, according to the present invention, a charge control device is provided with a full charge detection circuit for checking whether a secondary cell is in a fully charged state or not based on the charge voltage and/or the charge current of the secondary cell, a control circuit for controlling the feeding of electric power to the secondary cell according to the output of the full charge detection circuit, a storage circuit for storing control information fed from outside on a nonvolatile basis, and a setting circuit for setting the level of the charge voltage and/or the charge current at which the full charge detection circuit recognizes the fully charged state according to the control information read from the storage circuit.

With this configuration, it is possible to realize a charge control device that can accurately control the charging of a secondary cell by canceling the influence of stress occurring when an IC is packaged or mounted on a circuit board and other factors.

What is claimed is:

1. A battery pack comprising:
   a rechargeable secondary cell;
   a charge control device for controlling charging of the secondary cell by monitoring a charge state thereof;
   feed terminals connected to a direct-current electric power supply; and
   a switch device for opening and closing a path by way of which electric power is fed from the feed terminals to the secondary battery,
   wherein the charge control device comprises a full charge detection circuit for checking whether the secondary cell is in a fully charged state or not based on a charge voltage and/or a charge current of the secondary cell, a control circuit for controlling driving of the switch device according to an output of the full charge detection circuit, a storage circuit for storing control information, and a setting circuit for setting a level of the charge voltage and/or the charge current at which the full charge detection circuit recognizes the fully charged state according to the control information read from the storage circuit, the control information being fed into the storage circuit from outside of the charge control device.

2. A battery pack as claimed in claim 1,
wherein the full charge detection circuit comprises:
a first comparator for comparing the charge voltage of the secondary cell with a reference voltage;
a sense resistor for detecting the charge current of the secondary cell; and
a second comparator for comparing voltages at both ends of the sense resistor,
wherein results of comparison by the first and second comparators are fed to the control circuit.

3. A battery pack as claimed in claim 2,
wherein the setting circuit comprises:
a variable reference voltage source for varying the reference voltage; and
an offset circuit for offsetting a level at which the second comparator inverts an output thereof,
wherein the variable reference voltage source and the offset circuit are controlled according to the control information read from the storage circuit.

4. A battery pack as claimed in claim 1,
wherein all circuits constituting the charge control device are sealed into a single package.

5. A battery pack as claimed in claim 1,
wherein the storage circuit is a nonvolatile memory.

6. A battery pack as claimed in claim 1,
wherein the control information is so formulated as to optimize the level of the charge voltage and/or the charge current at which the full charge detection circuit recognizes the fully charged state by canceling influence of stress occurring when the charge control device is packaged or mounted on a circuit board, and fabrication-associated variations in the secondary cell itself.

7. A battery pack as claimed in claim 6,
wherein the control information is so formulated as to reduce variations in the level detected by the full charge detection circuit to within ±0.1%.

* * * * *